United States Patent [19]

Silver et al.

[11] Patent Number: 5,235,528
[45] Date of Patent: Aug. 10, 1993

[54] METHOD AND APPARATUS FOR CALIBRATING AND CORRECTING MAGNETIC AND GEOMETRICAL DISTORTIONS IN AN IMAGING SYSTEM

[75] Inventors: Michael D. Silver, Northbrook; Thomas C. Judd, Skokie, both of Ill.

[73] Assignee: Kabushiki Kaisha Toshiba, Kanagawa, Japan

[21] Appl. No.: 593,659

[22] Filed: Oct. 5, 1990

[51] Int. Cl.$^5$ .................................... G06F 15/00
[52] U.S. Cl. .................... 364/571.07; 364/413.18; 250/363.09; 378/7; 378/70
[58] Field of Search ............. 364/571.01, 571.02, 364/571.04, 571.07, 560, 413.13-413.19; 250/363.07, 363.09, 396 R; 378/7, 70; 356/2, 376

[56] References Cited

U.S. PATENT DOCUMENTS 4,149,079 4/1979 Ben-Zeev et al.
4,280,178 7/1981 Nassi et al.
4,403,289 9/1983 Lux et al.

FOREIGN PATENT DOCUMENTS 1579265 11/1980 United Kingdom.

OTHER PUBLICATIONS

Chakraborty, "Image Intensifier Distortion Correction," Med. Phys. 14(2), (Mar./Apr. 1987).
Boone et al., "Analysis and Correction of Imperfections in the Image Intensifier TV-Digitizer Imaging Chain," 75th Annual Meeting of the Radiological Society of North America (Nov. 27, 1989, Chicago).

Primary Examiner—Edward R. Cosimano
Assistant Examiner—Edward Pipala
Attorney, Agent, or Firm—Finnegan, Henderson, Farabow, Garrett & Dunner

[57] ABSTRACT

A method and apparatus to calibrate and correct magnetic and geometrical distortions in an imaging system, specifically a computer tomography (CT) system, includes a calibration object which is placed on the surface of an image intensifier. An image frame of the calibration object is generated, and a vertical correction table is generated corresponding to the amount of image distortion caused to the image frame of the calibration object. The image frame is corrected using the vertical correction table, and the corrected image frame data is summed or averaged and either stored for further transformation into a slice image or used to generate a horizontal correction table to correct distortions in the horizontal direction. Once the vertical and horizontal correction tables have been generated using the calibration object, subsequent image frames are corrected using the correction values in the correction tables.

30 Claims, 6 Drawing Sheets

| 0 | 1 | 2 | 3 | | 256 | | 508 | 510 | 511 |
|---|---|---|---|---|---|---|---|---|---|
| 20.3 | 20.3 | 20.1 | 19.8 | ... | 16.0 | ... | 12.3 | 12.2 | 12.0 | 12.0 |

VERTICAL CORRECTION TABLE
BEFORE NORMALIZATION

| 0 | 1 | 2 | 3 | | 256 | | 508 | 510 | 511 |
|---|---|---|---|---|---|---|---|---|---|
| 8.3 | 8.3 | 8.1 | 7.8 | ... | 4.0 | ... | .3 | .2 | 0 | 0 |

VERTICAL CORRECTION TABLE
AFTER NORMALIZATION

|   | 1 | 2 | 3 | 4 |   |   |   | 26 | 27 |
|---|---|---|---|---|---|---|---|----|-----|
|   | 4.2 | 25.7 | 45.1 | 63.8 | · | · | · | 489.3 | 510.1 |

PRELIMINARY TABLE

*FIG. 9*

|   | 1 | 2 |   |   |   | 19 | 20 |   |   |   | 38 | 39 |   |   |   | 494 |
|---|---|---|---|---|---|----|----|---|---|---|----|----|---|---|---|-----|
|   | 4.2 |  | · | · | · | 25.7 |  | · | · | · | 45.1 |  | · | · | · | 510.1 |

HORIZONTAL CORRECTION TABLE
BEFORE COMPLETION

*FIG. 10A*

|   | 1 | 2 |   |   |   | 19 | 20 |   |   |   | 38 | 39 |   |   |   | 494 |
|---|---|---|---|---|---|----|----|---|---|---|----|----|---|---|---|-----|
|   | 4.2 | 6.5 | · | · | · | 25.7 | 27.7 | · | · | · | 45.1 | 47 | · | · | · | 510.1 |

HORIZONTAL CORRECTION TABLE
AFTER COMPLETION

*FIG. 10B*

METHOD AND APPARATUS FOR CALIBRATING AND CORRECTING MAGNETIC AND GEOMETRICAL DISTORTIONS IN AN IMAGING SYSTEM

BACKGROUND OF THE INVENTION

1. Field of the Invention

The present invention relates to a method and apparatus for calibrating and correcting magnetic and geometrical distortions in an imaging system, and, more specifically, to calibrating and correcting magnetic and geometrical distortions in an image intensifier-based computed tomography (CT) system.

2. Description of the Related Art

An image intensifier-based CT system utilizes an image intensifier to detect x-rays emitted by an x-ray source after they are passed through an object under test. The image intensifier converts x-ray photons to optical photons to electrons, which are accelerated and focused down the length of the image intensifier onto a small phosphor screen. The phosphor screen generates an image which is recorded by an optical sensor which outputs a video signal typically formatted into 525 lines of video information. This video signal is then digitized for further processing.

A two-dimensional slice image of an object under test is reconstructed from a plurality of the image frames corresponding to a plurality of views of the object under test taken as either the object under test is rotated 360° on a turntable (turntable rotation) or as the x-ray source and image intensifier are rotated 360° around the stationary object under test (gantry rotation). For example, if the system produces 30 image frames per second and the turntable or gantry completes one rotation every 60 seconds, the slice image will be reconstructed from 1800 separate image frames corresponding to the 1800 distinct views of the object under test.

Image intensifiers impart two distortions to the positions of detected x-ray photons. The first distortion is due to the construction geometry of the image intensifier and is referred to as "geometrical" distortion. This distortion causes a pagoda-like distortion of the detected image frame. That is, if a set of nested squares are formed by wires and placed on the entrance surface of the image intensifier, the output image appears as shown in FIG. 1. This is also referred to as "pin-cushion" distortion.

The second distortion is caused by the magnetic force of the earth, and will be found in any imaging system using an x-ray detector having an electron tube. Because the x-ray detector (image intensifier) accelerates electrons down its length, these electrons are subject to magnetic distorting forces of the form:

$$\vec{F} = q\vec{v} \times \vec{B}, \quad (1)$$

where $\vec{F}$ is the distorting force vector;
  $q$ is the elementary charge of the electron;
  $\vec{v}$ is the velocity vector of the electron; and
  $\vec{B}$ is the magnetic field vector of the earth.
This distorting force further twists the image of FIG. 1.

If the imaging system is a turntable rotation system, these two distortions are constant for each image frame generated by the image intensifier. However, if the imaging system is a gantry rotation system, the magnetic distortion differs for each image frame generated by the image intensifier. The magnetic distorting force distorts each image frame differently due to the different orientation of the image intensifier as the gantry rotates.

Additional magnetic distortions result in any imaging system using a tube TV camera as an optical sensor as a result of the moving electrons in the TV imaging tube.

SUMMARY OF THE INVENTION

Accordingly, it is an object of the present invention to provide a method and apparatus for calibrating and correcting magnetic and geometrical distortions in an imaging system.

It is another object of the present invention to provide a method and apparatus to calibrate and correct vertical magnetic and geometrical distortions in an imaging system.

It is another object of the present invention to provide a method and apparatus to calibrate and correct horizontal magnetic and geometrical distortions in an imaging system.

It is another object of the present invention to provide a method and apparatus to calibrate and correct vertical and horizontal magnetic and geometrical distortions in an imaging system.

It is another object of the present invention to provide a calibration object which can be used to calibrate imaging systems to correct for magnetic and geometrical distortions.

Additional objects and advantages of the invention will be set forth in the description which follows, and in part will be apparent from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, an apparatus is provided for correcting distortions in an imaging system, comprising: a calibration object having at least one reference line; a device for generating an image frame of the calibration object; a device for generating a correction table including a plurality of correction values corresponding to amounts of distortion of the reference line at a plurality of locations in the image frame; and a device for correcting distortions of an object under test using the plurality of correction values in the correction table.

To further achieve the foregoing objects, and in accordance with the purposes of the invention as embodied and broadly described herein, a method is provided for correcting distortions in an imaging system using a calibration object having at least one reference line, comprising the steps of: generating an image frame of the calibration object; generating a correction table including a plurality of correction values corresponding to amounts of distortion of the reference line at a plurality of locations in the image frame; and correcting distortions of an object under test using the plurality of correction values in the correction table.

BRIEF DESCRIPTION OF THE DRAWINGS

The accompanying drawings, which are incorporated in and constitute a part of the specification, illustrate a presently preferred embodiment and method of the invention and, together with the general description given above and the detailed description of the preferred embodiment given below, serve to explain the principles of the invention. Of the drawings:

FIG. 9 is a preliminary table utilized for the horizontal correction technique of the present invention;

FIG. 10A is a horizontal correction table before completion in accordance with the present invention; and FIG. 10B is a horizontal correction table after completion in accordance with the present invention.

DETAILED DESCRIPTION OF THE INVENTION

Reference will now be made in detail to a presently preferred embodiment of the invention as illustrated in the accompanying drawings.

Figure 2:
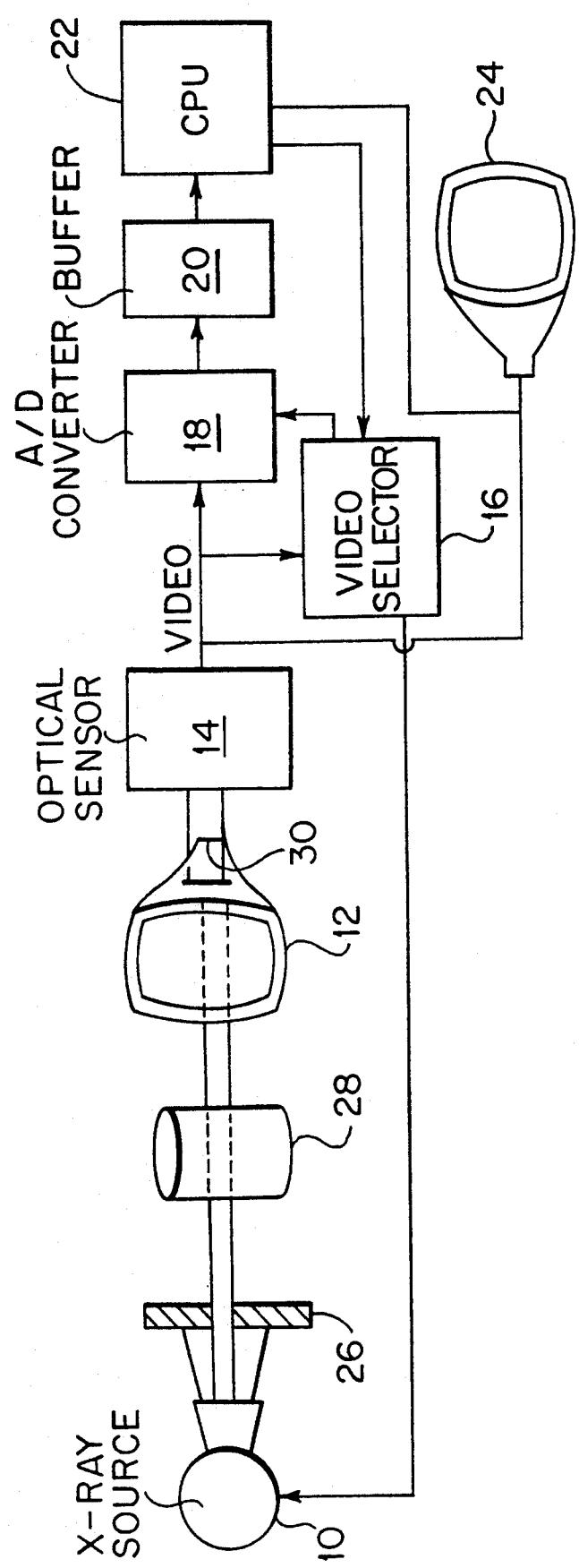
FIG. 2 is a block diagram of a distortion correcting imaging system in accordance with the present invention.

FIG. 2 illustrates a CT imaging system in accordance with the present invention. The CT imaging system includes x-ray source 10, x-ray detector 12, optical sensor 14, video selector 16, A-to-D converter 18, buffer 20, CPU 22, and display 24. Optionally, the system also includes collimator 26. Although buffer 20 is shown as a separate component, more typically buffer 20 constitutes part of the CPU 22.

An object under test 28 is disposed on a turntable (not shown) for rotation between the x-ray source 10 and the x-ray detector 12 in accordance with conventional techniques. Alternatively, the x-ray source 10 and the x-ray detector 12 are disposed on a rotating gantry (not shown) which is rotated around the stationary object under test 28 in accordance with conventional techniques.

X-ray source 10 emits a cone of x-rays toward the object under test 28. The x-rays may be collimated by collimator 26 to select the slice width of the object under test 28, or the entire cone of x-rays may be permitted to pass through the object under test 28 to the x-ray detector 12.

As embodied herein, x-ray detector 12 comprises an image intensifier which, as discussed, converts x-ray photons to optical photons to electrons, which are focused and accelerated toward a phosphor screen 30 contained in the image intensifier 12. The phosphor screen 30 reconverts the electrons back to optical photons to form an image frame of the object under test 28. Preferably this image frame is 525 lines of video information.

The image frame on the phosphor screen 26 is recorded by optical sensor 14. As embodied herein, optical sensor 14 may comprise a camera, a charge-coupled diode converter or some other solid state device suitable for recording the image frame from the phosphor screen 30 of the image intensifier 12. In a preferred embodiment, the optical sensor 14 comprises an MTV-32D saticon T.V. camera, manufactured by Toshiba Corp.

Video selector 16 is provided to select pixels, lines and frames of video information output by the optical sensor 14 for digitization in A-to-D converter 18. Typically, an A-to-D converter digitizes each of the 525 video lines into 512 pixels of video information. Copending patent application bearing attorney U.S. Pat. Ser. No. 07/593,861, now U.S. Pat. No. 5,111,490 filed on even date herewith and assigned to the same assignee as this application (the entire contents of which are hereby incorporated by reference), discloses a preferred embodiment of video selector 16. As described therein, video selector 16 can be programmed through CPU 22 to select the total number of frames of video information to be digitized, the specific frames out of the total number of frames generated during a scanning period to be converted, the specific lines in each frame to be converted, and the number of pixels in each line to be converted. This selected video information is converted to digital information by the digital converter 18.

As is also described in the U.S. Pat. No. 5,111,490, the video selector 16, also provides a control signal to the x-ray source 10 to provide dose control over the amount of x-rays to which an object under test is exposed. This is particularly important if the object under test is a human being or an animal.

The selected digitized data is transferred to the buffer memory 20 for temporary storage before being forwarded to the CPU system memory (not shown) in the CPU 22. CPU 22 processes the digitized data to correct magnetic and geometrical distortions and to provide CT slice images which are displayed on display 24.

CPU 22 may comprise any analog or digital computer or computational device or devices having sufficient memory allocation and operating speed to carry out the distortion correction techniques of the present invention. In a preferred embodiment, CPU 22 comprises a personal computer, such as the AST-386 PC, which may be modified to provide additional processing power as necessary.

As embodied herein, display 24 is provided with inputs from both the optical sensor 14 and the CPU 22. In this implementation, a switching device (not shown) is provided to determine which source of video input will be displayed. Alternatively, separate displays could be provided for separately displaying the output video information of the optical sensor 14 and the CPU 22.

The correction techniques of the present invention provide for distortion corrections in both the vertical and horizontal directions.

In accordance with the calibration and correction techniques of the present invention, before generating image frames of the object under test, image frames of a calibration object are generated to "measure" both the vertical and horizontal distortions.

Figure 1:
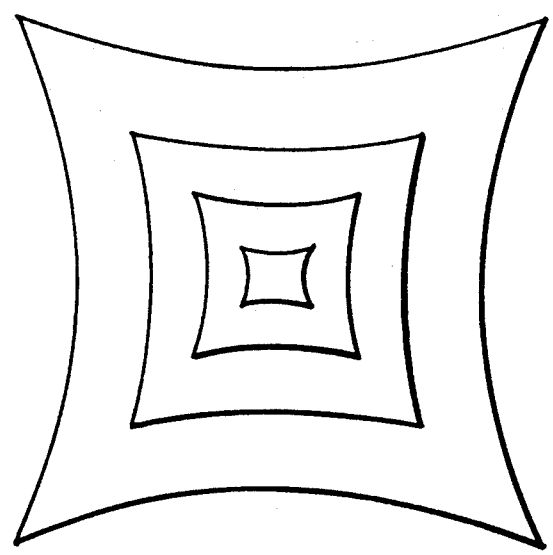
FIG. 1 is a drawing illustrating "pin-cushion" distortion in an image-intensifier based CT system.
Figure 3:
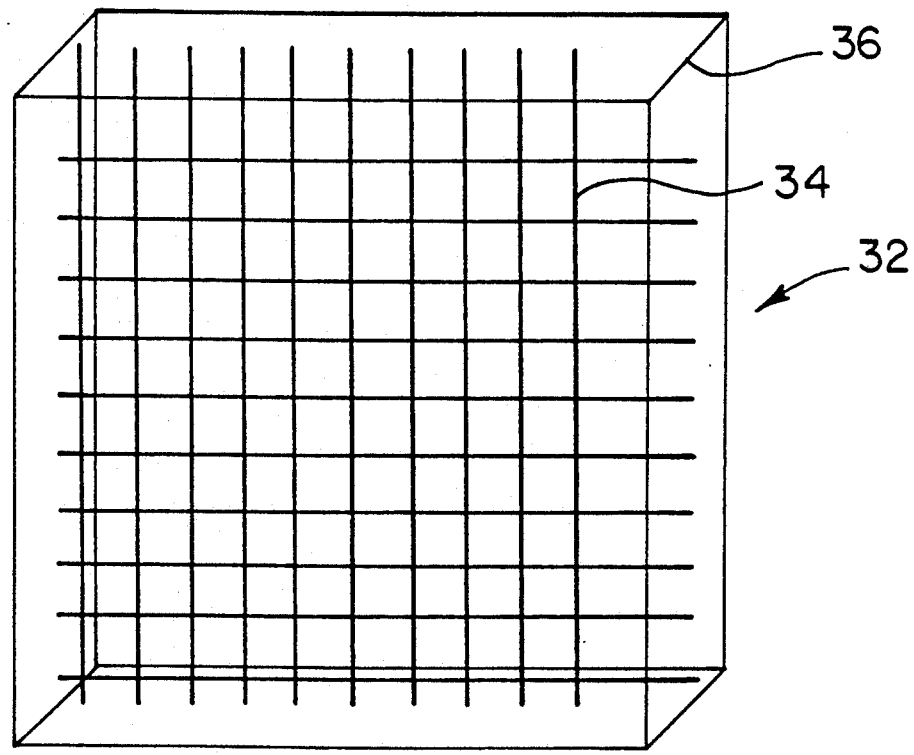
FIG. 3 is a diagram of a calibration object in accordance with the present invention.

As shown in FIG. 3, a calibration object 32 comprises a grid of opaque objects 34. As embodied herein, the opaque objects comprise copper wires 0.5 mm in diameter. A first set of 27 parallel wires, 0.5 inches apart, are provided in one direction, and a second set of 27 parallel wires, 0.5 inches apart are provided perpendicular to the first set of 27 parallel wires. The wires are contained within a block of acrylic plastic 36, 14" on each side and 11/16" thick. The dimensions of the wire grid, wires and plastic block should be chosen to meet and accommodate the dimensions of the image intensifier 12.

Both vertical and horizontal corrections are performed in CT imaging systems using either a rotating table configuration or a rotating gantry configuration. Corrections for systems using gantry rotation are more complex than for systems using rotating turntables because, as discussed, each image frame taken as the gantry rotates around the object under test exhibits different distortions due to the magnetic forces operating on the system, which change with the gantry rotation. Vertical and horizontal correction techniques of the present invention will first be described for a CT system using a rotating table to rotate the object under test with respect to a stationary x-ray source and x-ray detector. These correction techniques are henceforth referred to as "turntable corrections."

1. Turntable Corrections

Vertical distortion correction is provided by placing the calibration object 32 on the face of image intensifier 12 and generating an image frame of the calibration object 32. Alternatively, the calibration object can be disposed on a turntable (not shown). However, the translation technique utilized to generate the slice image would have to be accommodated for the spacing between the turntable and the image intensifier 12, in accordance with conventional techniques.

Figure 4:
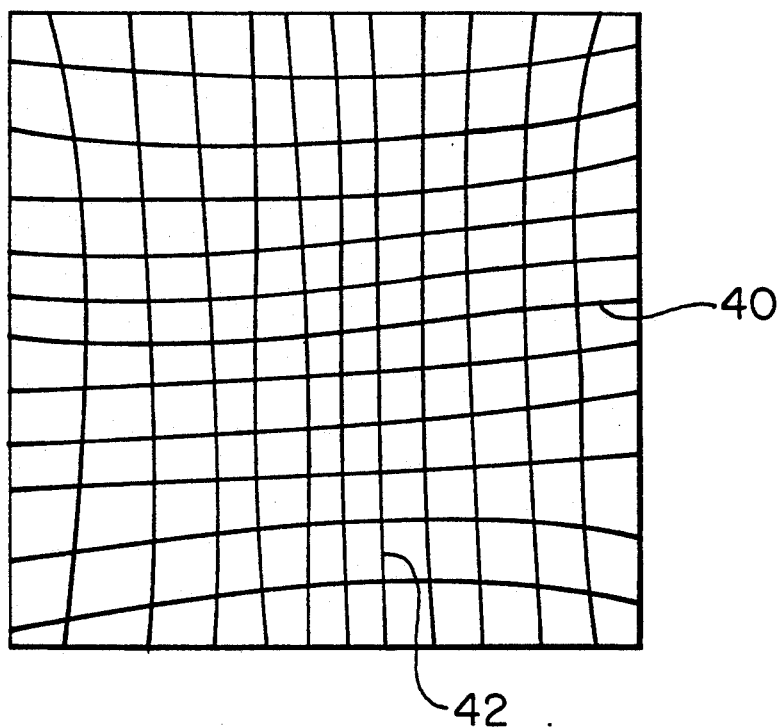
FIG. 4 illustrates a displayed image frame of the calibration object of FIG. 3, which has not been corrected for distortions.

A display of the image frame of the calibration object might look as shown, for example, in FIG. 4. Due to geometrical and magnetic distortions, the horizontal grid wires 40 of the calibration object are not perfectly horizontal. Further, the vertical wires 42 in the center of the image frame appear closer together than those at the edges of the image frame. The vertical correction technique corrects the bending of the horizontal grid wires and the horizontal correction technique corrects the spacing between the vertical grid wires.

Through experimentation, it has been found that if 32 lines of the 525 lines comprising the image frame of the calibration object are selected and displayed, the complete distortion of at least one horizontal grid wire of the calibration object 32 can be observed. If these 32 lines are selected from the central portion of the image frame, it can be assumed for purposes of this invention, that the horizontal grid wires are distorted equally by the distorting forces and appear parallel (although bent) in this central portion of the image frame. Thus, collimator 26 and video selector 16 are adjusted to select a predetermined set of at least 32 lines from the central portion of the image frame to implement the vertical correction technique.

Figure 5:
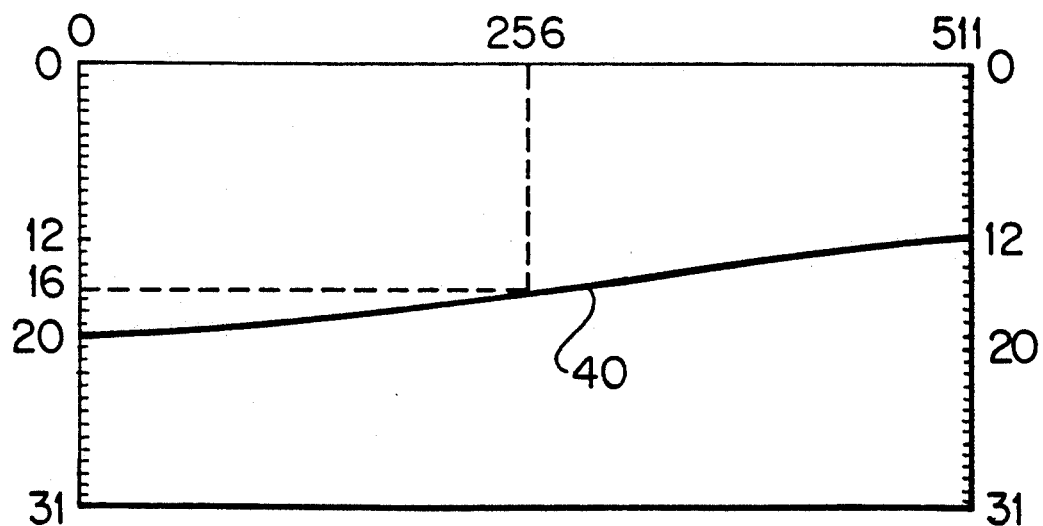
FIG. 5 is an expanded view of 32 lines (a partial frame) of the image frame in FIG. 4, with only one horizontal line being illustrated.

To more clearly illustrate the vertical distortion correction, FIG. 5 shows an expanded displayed image of 32 lines selected from the central portion of the image frame of the calibration object 32. For convenience, these 32 lines have been renumbered 0-31. Henceforth, these 32 lines will be referred to as a "partial image frame." Also for convenience, only one horizontal grid wire 40 is illustrated in FIG. 5.

If this image of the calibration object 32 were not distorted, the horizontal grid wire 40 would appear as a straight line across, for example, line 12 of the displayed partial image frame. However, due to distortions, as illustrated, the horizontal grid wire 40 is distorted by eight lines at the left edge of the partial image frame (column 0). Further, for each column of the partial image frame, there exists an offset value corresponding to the number of lines by which the horizontal grid wire 40 is displaced from line 12. For example, at columns 0-3 the offset from line 12 is eight lines (20-12), whereas at column 256, the offset from line 12 is four lines (16-12). This offset is calculated for each column to generate a vertical correction table, and the data values of each column of subsequent image frames or partial image frames are offset by a corresponding amount to correct for vertical distortions in the image frame or partial image frame.

To determine the offset for each column, the location of the distorted horizontal wire 40 (in terms of image frame lines) is identified for each column. As embodied herein, this is accomplished by determining the average data value of all 32 pixels in each column. Data values corresponding to the grid wires will typically be significantly lower than the average data value because the grid wires block x-rays from being detected at that location. To prevent identifying erroneous data values as corresponding to the horizontal grid wire 40, as embodied herein, a predetermined threshold is selected (for example one-half the dynamic range of the data values in the column, below the column average) below which data values are known to correspond to the grid wires. Unless the data value is below this threshold, the system will not consider it to correspond to horizontal wire 40. Thus, the CPU begins at column 0, line 0 to determine if the data value for that pixel is a predetermined threshold level below the average data value for column 0. If not, the CPU reads the data value at line 1 of column 0 to make the same determination, and so on until the horizontal grid wire 40 is identified in column 0.

As embodied in FIG. 5, when the CPU reads the data value at line 20 of column 0, it identifies this as being the horizontal grid wire 40. The CPU then compares the data value of line 20 to that of line 21 to determine which data value is lower so as to determine the center of the horizontal grid wire 40. For example, although in FIG. 5, the horizontal grid wire 40 is shown as being one-dimensional, in reality the horizontal grid wire 40 has some width and may comprise data values of varying intensities from, for example, lines 19-21. The CPU continues to compare subsequent data values to locate more precisely the line corresponding to the center of the horizontal grid wire 40.

Figures 6, 7A, 7B:
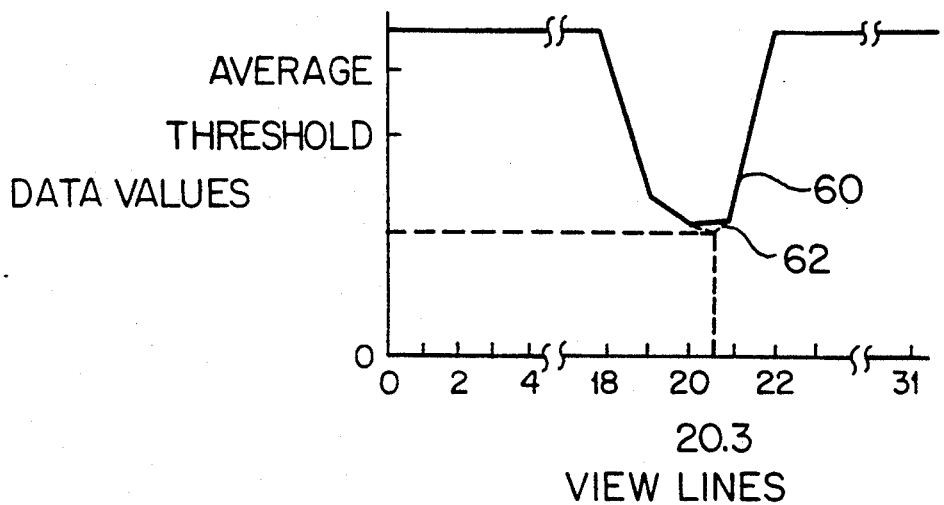
FIG. 6 is a graph showing a parabolic interpolation to detect a minimum data value.
FIG. 7A is a vertical correction table before being normalized in accordance with the present invention.
FIG. 7B is a vertical correction table after being normalized in accordance with the present invention.

In a preferred embodiment, a parabolic interpolation is further employed to identify the theoretical center of the horizontal grid wire 40 which may occur between image frame lines. For example, as shown in FIG. 6, a graph of the discrete data values for lines 0-31 of column 0 corresponds to the solid curve 60. However, as shown by the dotted curve 62, a parabolic interpolation of these data values may identify the theoretical minimum of the parabola (hence, the center of the grid wire) at line 20.3. This decimal precision can be used to provide a weighting function to grade subsequent corrections, as will be described below. Any conventional method or technique for providing this interpolation may be employed in accordance with the invention.

Thus, as embodied herein, the CPU identifies the horizontal grid wire 40 as corresponding to line 20.3 in column 0. This value is stored in a memory location of a vertical correction table corresponding to column 0.

This same procedure is repeated 511 times, once for each additional column of data values in the partial image frame, until a vertical correction table of 512 values has been generated. This table is shown, for example, in FIG. 7A, which has not been normalized.

The table of values of FIG. 7A is then normalized to zero as shown in FIG. 7B, to generate a vertical correction table having offset values for each column of the partial image frame. This correction table can be used to correct vertical distortions for any subsequent image frame or partial image frame generated by the CT image system. For example, having generated the vertical correction table shown in FIG. 7B, an operator may desire to provide a slice image of an object under test. Assuming that the system generates 30 image frames each second and that the rotating table supporting the object under test makes one complete rotation in 60 seconds, 1800 image frames will comprise the CT slice image. The vertical correction table of FIG. 7B is utilized to correct the data values for each of these 1800 image frames or partial image frames.

Specifically, the image frame lines are corrected using the offset values of the vertical correction table of FIG. 7B in accordance with the following relationship:

$$D_{out}[c, l] = (1 - F) \cdot D_{in}[c, l + I] + F \cdot D_{in}[c, l + 1 + I] \quad (2)$$

where $D_{out}[c, l]$ = the corrected data value for the pixel corresponding to column (c) and line (l);

where $D_{in}[c, l]$ = the uncorrected data value for the pixel corresponding to column (c) and line (l);

where I = the integer portion of the correction value for column (c) taken from the vertical correction table; and where F = the fractional portion of the correction value for column (c) taken from the vertical correction table.

Figure 8A:
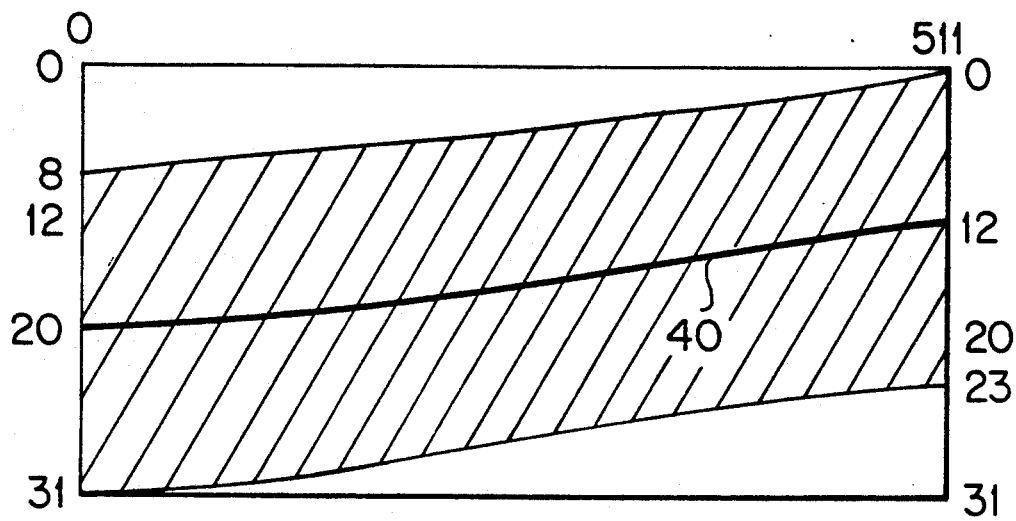
FIG. 8A illustrates which data values are corrected in accordance with the vertical distortion correction technique of the present invention.

As shown in FIG. 8A, correction of the partial image frame of FIG. 5, in accordance with relationship (2) above, has the effect of selecting only data values from the cross-hatched portion of the uncorrected partial image frame for the vertically corrected data set.

The vertical correction technique of the invention reduces the number of data values in the vertically corrected data set. This is illustrated, for example in FIG. 8B, which shows a display of the corrected partial image frame of FIG. 8A. As shown, only lines 0–23 (the cross-hatched portion) remain in the data set corresponding to the corrected partial image frame. As illustrated, the bend in the horizontal grid wire 40 is straightened out in accordance with the correction values of the vertical correction table.

Figure 8B:
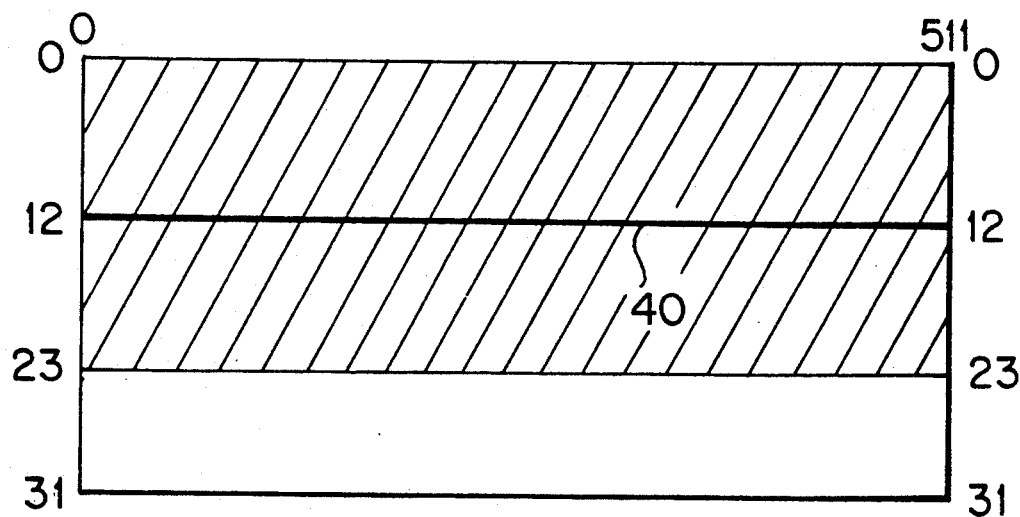
FIG. 8B illustrates a displayed image of the vertically corrected partial image frame of FIG. 5.

As discussed above, the fractional portion F of the offset values in the vertical correction table are utilized in the correction technique of the present invention to provide a weighting function between data values of adjacent lines of an image frame or partial image frame. For example, in accordance with relationship (2) above, the corrected data value corresponding to column 0, line 0 of the corrected partial image frame shown in FIG. 8B, is 0.7 times the data value from column 0, line 8 of the distorted partial image frame shown in FIG. 8A, plus 0.3 times the data value for column 0, line 9 of the partial image frame shown in FIG. 8A. In this manner, the fractional portions of the correction values in the vertical correction table are utilized to grade the intensity of the corrected data values based on adjacent line data values.

Alternatively, a faster computational implementation is possible with a nearest neighbor correction technique rather than the linear interpolation technique provided in relationship (2) above. In the nearest neighbor correction technique, the table correction values are rounded to the nearest whole number and the vertical correction is provided in accordance with the relationship:

$$D_{out}[c, l] = D_{in}[c, l + I], \quad (3)$$

where $D_{out}[c, l]$ = the corrected data value for the pixel corresponding to column (c) and line (l);

where $D_{in}[c, l]$ = the uncorrected data value for the pixel corresponding to column (c) and line (l); and where I = the nearest whole number to the correction value for column (c) taken from the vertical correction table.

The 24 corrected partial image frame lines are then summed or averaged to provide a single line of 512 data values.

This process is repeated 1800 times, once for each of the 1800 image frames which comprise the slice image, to generate 1800 single lines of 512 data values. Preferably, this process is performed in real time to reduce the overall data load.

These data values may be displayed as what is commonly known as a sinogram. However, more typically, these data values are further processed and manipulated in accordance with conventional CT techniques to generate the slice image of the object under test. As embodied herein, the inverse Radon transform implemented using the convolution backprojection algorithm is utilized to transform the data values to slice image form. However, any conventional transformation techniques may be utilized to transform the data to slice image form for display.

Although the slice image may be comprised of only vertically corrected image frames or partial image frames, more typically, the vertically corrected image frames or partial image frames are further corrected for horizontal distortions before the slice image is displayed. Horizontal correction of the distorted image frames or partial image frames will now be discussed with respect to the turntable corrections.

As embodied herein, the horizontal correction technique of the present invention corrects the perceived irregular spacing between the vertical grid wires 42, which are distorted from their regular interval in the calibration object 32. The horizontal correction is performed on the sinogram data values after the image frames or partial image frames have been vertically corrected and summed or averaged into single lines of data values for each image frame or partial image frame of the slice image. However, a horizontal correction table must first be generated.

For horizontal correction, data values corresponding to the distorted vertical grid wires 42 of the calibration object 32 must be identified. As discussed, these data values are lower than the average data value of a predetermined image frame line of data values, and a predetermined threshold is selected to clearly identify the vertical grid wires and prevent identifying spurious noise changes as incorrect vertical grid wire locations.

The system scans a line of the vertically corrected and summed or averaged data values to detect the column locations corresponding to vertical grid wires 42 of the calibration object 32. This is done in a manner similar to the detection of horizontal grid wires 40 in each column for the vertical correction technique. However, as embodied herein, the scan is made along only one line of the sinogram data values for the horizontal correction technique. All 512 columns are scanned to identify the locations of each vertical grid wire 42. Also in a manner similar to that performed for the vertical correction technique, a parabolic or other type of interpolation technique may be employed to identify the theoretical centers of the vertical grid wires 42.

Since the calibration object 32 embodied herein has 27 vertical grid wires, the system will identify 27 columns corresponding to the vertical grid wire centers. These 27 columns are stored in a preliminary table. This is illustrated in FIG. 9, where, for example, the data value for the first vertical grid wire in the calibration object has been found to occur at column 4.2, the data value for the second vertical grid wire has been found to occur at column 25.7, up through the data value for the 27th vertical grid wire which has been found to occur at column 510.1.

Using the 27 column location values from the preliminary table, a horizontal correction table is generated. There are 26 intervals between the first and 27th vertical grid wires. Dividing the 512 pixel locations of a line of the sinogram by 26 intervals yields a value of 19.69 as the number of pixel locations or columns per interval. As embodied herein, for computational simplicity and efficiency, only the integer portion of this value (19) is used. Multiplying this value (19) times the number of intervals (26) yields 494 as the number of correction values in the horizontal correction table embodied herein. Thus, one value from the preliminary table of 27 values is located every 19 locations in the horizontal correction table, as shown in FIG. 10A. Thus, in the preferred embodiment, the horizontal correction table has a lower number of values (494) than the number of columns (512).

Linear interpolation is then used to fill in the intermediate values of the horizontal correction table according to the relationship:

$$F_{(19n+i)} = \frac{i}{19} \cdot (f_{n+1} - f_n) + f_n \qquad (4)$$

where $F_{(19n+i)}$ = correction table values between the given 27 values from the preliminary table;

where $i$ = the location in the horizontal correction table between two given values from the preliminary table $0 \leq i \leq 18$; and where $f_n$ = given 27 values in the preliminary table $0 \leq n \leq 25$.

For example, the interpolated value for column two in the horizontal correction table is calculated as:

$$F_2 = \frac{2}{19} \cdot (25.7 - 4.2) + 4.2$$
$$= 6.5$$

This process is repeated until the horizontal correction table is completed, as shown for example in FIG. 10B.

Each line of the vertically corrected and summed or averaged data values is then horizontally corrected using the correction values from the horizontal correction table in accordance with the following relationship:

$$D_{out}[c] = (1 - F) \cdot D_{in}[I] + F \cdot D_{in}[I + 1] \qquad (5)$$

where $D_{out}[c]$ = the corrected data value corresponding to column (c);

where $D_{in}[I]$ = the uncorrected data value corresponding to column (I);

where I = the integer portion of the correction value for column (c); and where F = the fractional portion of the correction value for column (c).

Only data values occurring between the columns corresponding to vertical grid wires 1 and 27 are considered for the horizontal correction.

Similar to the vertical correction, the fractional portions of the correction values in the horizontal correction table are utilized to grade the intensity of the corrected data values based on adjacent column data values.

Alternatively, the nearest neighbor correction technique can be used to provide the horizontal correction. In this embodiment, the table values are rounded to the nearest whole number, such that relationship (5) is reduced to:

$$D_{out}[c] = D_{in}[I] \qquad (6)$$

where $D_{out}[c]$ = the corrected data value corresponding to column (c);

where $D_{in}[I]$ = the uncorrected data value corresponding to column (I); and where I = the nearest whole number to the correction value for column (c).

As each line of data values corresponding to the 1800 image frames (the vertically corrected sinogram information) are horizontally corrected, they are stored to generate a vertically and horizontally corrected set of data values corresponding to sinogram information. These data values are then further processed and transformed using the inverse Radon transform implemented by the convolution backprojection algorithm into a slice image as described above for the vertical correction technique of the present invention. The slice image is then displayed on display 24.

2. Gantry Corrections

For imaging systems utilizing a gantry to rotate the x-ray source 10 and the x-ray detector 14 with respect to a stationary object under test 28, the vertical and horizontal corrections are similar to the turntable corrections. However, separate vertical and horizontal correction tables must be generated for each of the 1800 image frames which comprise the slice image. This is because, as the gantry rotates through 360° around the object under test, at each gantry position corresponding to each image frame, the magnetic distorting forces acting on the system differ.

For example, for the preferred embodiment in which the gantry makes a complete rotation around the object under test every 60 seconds and takes 30 image frames per second, totaling 1800 image frames per scan, the vertical correction table for gantry correction requires 1800 separate lines of correction values, one for each image frame. Thus, the vertical correction table becomes two-dimensional, having 1800 lines and 512 correction values per line. Each line of the two-dimensional vertical correction table is generated in a manner similar to that described above with respect to the turntable correction. The process is simply repeated 1800 times, once for each image frame.

In an alternative embodiment, the vertical correction table may comprise only a fractional portion of the number of frames collected during a scan, such as 225, 450 or 900 separate lines of correction values. Each line is used to correct a corresponding number of image frames, such as 8, 4 or 2, respectively.

After the vertical correction table has been generated, subsequent distorted image frames are corrected in a manner similar to the vertical turntable correction described above. However, each image frame is corrected by the corresponding line of the two-dimensional vertical correction table.

In the alternative embodiment in which a lesser number of lines are used in the vertical correction table, more than one image frame or partial image frame is corrected using the same line of the vertical correction table. For example, if the vertical correction table is 225 lines, the first 8 image frames of the gantry rotation are corrected using line 1 of the vertical correction table, the second 8 image frames are corrected using line 2 of the vertical correction table, and so on.

As with the vertical turntable correction technique, the corrected image frame lines for each image frame are summed or averaged into a single line which comprises the sinogram data values to be transformed into the slice image. These vertically corrected and summed or averaged data values are used to perform the horizontal gantry correction.

To perform the horizontal gantry correction, a horizontal correction table is generated in a manner similar to that described with respect to the horizontal turntable correction technique. However, because of the gantry rotation, the horizontal correction table is again two-dimensional and preferably has one line of correction values for each image frame, i.e. 1800 lines of 494 correction values. Each line of the two-dimensional horizontal correction table is generated in a manner similar to that described above with respect to generating the horizontal correction table for horizontal turntable corrections. The process is simply repeated 1800 times, once for each image frame.

As with the vertical correction table, the number of correction lines in the horizontal correction table can be varied such that one line is used to correct more than one image frame.

After the horizontal correction table has been generated, subsequent distorted image frames are corrected in a manner similar to the horizontal turntable correction technique. However, for horizontal gantry corrections, each image frame is corrected by the corresponding line of the horizontal correction table. If the horizontal correction table includes less than one line for each image frame, more than one image frame is corrected using the same line of the horizontal correction table.

The data values, vertically and horizontally corrected, comprise sinogram data values which are transformed into the slice image in accordance with conventional techniques, as described above with respect to turntable corrections.

In the foregoing embodiments corresponding to both turntable and gantry corrections, vertical and horizontal corrections are performed. However, in an alternative embodiment, it is not necessary to perform the vertical correction, and only horizontal correction is performed. In particular, collimator 26 can be used to select the width of the x-ray fan beam to be narrow enough such that detected x-rays corresponding to the distorted x-ray fan beam lie within the selected number of frame lines selected by the video selector. In this embodiment, if the data values for each column of the resulting image frame or partial image frame are summed or averaged to a single line of video data values, the image frame need not be vertically corrected. However, a horizontal distortion correction in accordance with the present invention may still be performed.

While there has been illustrated and described what are at present considered to be preferred embodiments and methods of the present invention, it will be understood by those skilled in the art that various changes and modifications may be made, and equivalents may be substituted for elements thereof without departing from the true scope of the invention. In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments and methods falling within the scope of the appended claims.

What is claimed is:

1. A method of correcting distortions in an imaging system using a calibration object having at least one reference line, comprising the steps of:
   generating an image frame of said calibration object, said image frame including a plurality of columns and lines of data values, said image frame generating step including the steps of:
   irradiating said calibration object with x-rays, detecting x-rays which pass through said calibration object,
   generating a set of data values corresponding to said detected x-rays, and
   selecting a predetermined set of said data values corresponding to a predetermined partial image frame;

generating a correction table including a plurality of correction values corresponding to amounts of distortion of the reference line at a plurality of locations in said partial image frame, said correction table generating step including the steps of identifying locations of the reference line in each column of said partial image frame, storing a plurality of data values corresponding to the identified locations of the reference line for each column of said partial image frame, and normalizing to zero the stored plurality of data values corresponding to the identified locations in each column of the reference line to determine said correction values of said correction table; and correcting distortions of an object under test using said correction values in said correction table.

2. A method according to claim 1, wherein the step of identifying further includes the step of detecting a data value below a predetermined minimum.

3. A method according to claim 2, wherein the step of identifying further includes the step of interpolating between data values.

4. A method according to claim 1, wherein the step of correcting the distortion of an object under test comprises the steps of:

generating an image frame of said object under test, said image frame including a plurality of columns and lines of data values; and offsetting data values of each column of said image frame of the object under test by an amount equal to a corresponding correction value in the correction table.

5. A method according to claim 4, wherein the step of offsetting is performed for each column of said image frame of the object under test in accordance with the relationship:

$$D_{out}[c, l] = (1 - F) \cdot D_{in}[c, l + I] + F \cdot D_{in}[c, l + 1 + I]$$

where $D_{out}[c, l]$ = the corrected data value corresponding to column (c) and line (l);

where $D_{in}[c, l]$ = the uncorrected data value corresponding to column (c) and line (l);

where $I$ = the integer portion of the correction value for column (c) taken from the vertical correction table; and where $F$ = the fractional portion of the correction value for column (c) taken from the vertical correction table.

6. A method according to claim 4, wherein the step of offsetting is performed for each column of said image frame of the object under test in accordance with the relationship:

$$D_{out}[c, l] = D_{in}[c, l + I],$$

where $D_{out}[c, l]$ = the corrected data value for the pixel corresponding to column (c) and line (l);

where $D_{in}[c, l]$ = the uncorrected data value for the pixel corresponding to column (c) and line (l);

where $I$ = the nearest whole number to the correction value for column (c).

7. An apparatus for correcting distortions in an imaging system, comprising:

a calibration object having at least one reference line;

means for generating an image frame of said calibration object, said image frame including a plurality of columns and lines of data values, said image frame generating means including:

means for irradiating said calibration object with x-rays, means for detecting x-rays which pass through said calibration object, means for generating a set of data values corresponding to said detected x-rays, and means for selecting a predetermined set of said data values corresponding to a predetermined partial image frame;

means for generating a correction table including a plurality of correction values corresponding to amounts of distortion of the reference line at a plurality of locations in said partial image frame, said correction table generating means including means for identifying locations of the reference line in each column of said image partial frame, means for storing a plurality of values corresponding to the identified locations of the reference line for each column of said partial image frame, and means for normalizing to zero the stored plurality of values corresponding to the identified locations of the reference line to determine said correction values of said correction table; and means for correcting distortions of an object under test using said correction values in said correction table.

8. An apparatus according to claim 7, wherein said calibration object comprises a grid of opaque lines having a first set of parallel lines in a first direction and a second set of parallel lines perpendicular to said first set of parallel lines.

9. An apparatus according to claim 8, wherein said opaque lines of said calibration object comprise wires.

10. An apparatus according to claim 7, wherein the identifying means includes means for detecting data values below a predetermined minimum.

11. An apparatus according to claim 10, wherein the identifying means further includes means for interpolating between data values.

12. An apparatus according to claim 7, wherein said means for correcting the distortion of an object under test includes:

means for generating an image frame of said object under test, said image frame including a plurality of columns and lines of data values; and means for offsetting data values of each column of said image frame of the object under test by an amount equal to a corresponding correction value in the correction table.

13. An apparatus according to claim 12, wherein the offsetting means includes means for offsetting the data values for each column of said image frame of the object under test in accordance with the relationship:

$$D_{out}[c, l] = (1 - F) \cdot D_{in}[c, I + 1] + F \cdot D_{in}[c, I + 1 + 1]$$

where $D_{out}[c, l]$ = the corrected data value corresponding to column (c) and line (l);

where $D_{in}[c, l]$ = the uncorrected data value corresponding to column (c) and line (l);

where I = the integer portion of the correction value for column (c) taken from the vertical correction table; and where F = the fractional portion of the correction value for column (c) taken from the vertical correction table.

14. An apparatus according to claim 12, wherein the offsetting means includes means for offsetting the data values for each column of said image frame of the object under test in accordance with the relationship:

$$D_{out}[c, l] = D_{in}[c, I + 1],$$

where $D_{out}[c, l]$ = the corrected data value for the pixel corresponding to column (c) and line (l);

where $D_{in}[c, l]$ = the uncorrected data value for the pixel corresponding to column (c) and line (l);

where I = the nearest whole number to the correction value for column (c).

15. A method of correcting distortions in an imaging system using a calibration object having a plurality of substantially parallel reference lines, comprising the steps of:
generating an image frame of said calibration object, said image frame including a plurality of columns and lines of data values, said image frame generating step including the steps of:
irradiating said calibration object with x-rays, detecting x-rays which pass through said calibration object,
generating a set of data values corresponding to the detected x-rays, and
selecting a predetermined set of said data values corresponding to a predetermined partial image frame;
generating a correction table including a plurality of correction values corresponding to amounts of distortion between adjacent reference lines of the calibration object, said connection table generating step including the steps of:
identifying the columns of the data values corresponding to the reference lines,
storing a column number corresponding to each identified reference line at equally spaced locations of a correction table, and
filling-in the locations of the correction table between the column numbers; and
correcting distortions of an object under test using said correction values in said correction table.

16. A method according to claim 15, wherein the step of filling-in includes the step of linearly interpolating between the stored column numbers.

17. A method according to claim 15, wherein the step of correcting the distortion of an object under test includes the steps of:
generating an image frame of said object under test, said image frame including a plurality of columns and lines of data values;
summing or averaging the data values of each column of said image frame of said object under test into a single data value for each column so as to generate a single line of summed or averaged data values; and
offsetting the data values of selected columns of the image frame of the object under test by an amount equal to a corresponding correction value in the correction table.

18. A method according to claim 17, wherein the step of offsetting is performed in accordance with the relationship:

$$D_{out}[c] = (1 - F) \cdot D_{in}[I] + F \cdot D_{in}[I + 1]$$

where $D_{out}[c]$ = the corrected data value corresponding to column (c).

where $D_{in}[I]$ = the uncorrected data value corresponding to column (I)

where I = the integer portion of the correction value from the horizontal correction table corresponding to column (c); and where F = the fractional portion of the correction value from the horizontal correction table corresponding column (c).

19. A method according to claim 17, wherein the step of offsetting is performed in accordance with the relationship:

$$D_{out}[c] = D_{in}[I]$$

where $D_{out}[c]$ = the corrected data value corresponding to column (c);

where $D_{in}[I]$ = the uncorrected data value corresponding to column (I); and where I = the nearest whole number to the correction value for column (c).

20. An apparatus for correcting distortions in an imaging system, comprising:
a calibration object having a plurality of substantially parallel reference lines;
means for generating an image frame of said calibration object, said image frame includes a plurality of columns and of lines of data values, said image frame generating means including;
means for irradiating said calibration object with x-rays,
means for detecting x-rays which pass though said calibration object,
means for generating a set of data values corresponding to the detected x-rays, and means for selecting a predetermined set of said data values corresponding to a predetermined partial image frame;

means for summing or averaging the data values of each column of said image frame of said calibration object into a single data value so as to generate a single line of summed or averaged data values;

means for generating a correction table including a plurality of correction values corresponding to amounts of distortion between adjacent reference lines of the calibration object, said correction table generating means including means for identifying the columns of the data values corresponding to the reference lines, means for storing a column number corresponding to each identified reference line at equally spaced locations of a correction table, and means for filling-in the locations of the correction table between the column numbers; and means for correcting distortions of an object under test using said correction values in said correction table.

21. An apparatus according to claim 20, wherein said means for filling-in includes means for linearly interpolating between the stored column numbers;

22. An apparatus according to claim 20, wherein said means for correcting the distortion of an object under test includes:

means for generating an image frame of said object under test, said image frame including a plurality of columns and lines of data values;

means for summing or averaging the data values of each column of said image frame into a single data value for each column so as to generate a single line of summed or averaged data values;

means for offsetting the data values of selected columns of the image frame of the object under test by an amount defined by a corresponding correction value in the correction table.

23. An apparatus according to claim 22, wherein the means for offsetting the data values includes means for offsetting the data values in accordance with the relationship:

$$D_{out}[c] = (1 - F) \cdot D_{in}[I] + F \cdot D_{in}[I + 1]$$

where $D_{out}[c]$ = the corrected data value corresponding to column (c).

where $D_{in}[I]$ = the uncorrected data value corresponding to column (I)

where I = the integer portion of the correction value from the horizontal correction table corresponding to column (c); and where F = the fractional portion of the correction value from the horizontal correction table corresponding to column (c).

24. An apparatus according to claim 22, wherein the means for offsetting the data values includes means for offsetting the data values in accordance with the relationship:

$$D_{out}[c] = D_{in}[I]$$

where $D_{out}[c]$ = the corrected data value corresponding to column (c);

where $D_{in}[I]$ = the uncorrected data value corresponding to column (I); and where I = the nearest whole number to the correction value for column (c).

25. A method of correcting distortions in an imaging system using a calibration object having at least one horizontal reference line and a plurality of substantially plural vertical reference lines, comprising the steps of generating an image frame of said calibration object, said image frame including a plurality of columns and lines of data values, said image frame generating step including a steps of:

irradiating said calibration object with x-rays, detecting x-rays which pass through said calibration object, generating a set of data values corresponding to said detected x-rays, and selecting a predetermined set of said data values corresponding to a predetermined partial image frame;

generating from said selected data values a first correction table including a plurality of first correction values corresponding to amount of vertical distortion of the horizontal reference line at a plurality of column locations in said image frame;

applying said first correction values to generate a line of vertically corrected data values for the horizontal reference line;

scanning said line of vertically corrected data values to identify the column locations of each of the vertical reference lines;

generating a second correction table including second correction values corresponding to amounts of horizontal distortion between the vertical reference lines; and correcting distortions of an object under test using said first and second correction values.

26. An apparatus for correcting distortions in an imaging system, comprising:

a calibration object having at least one horizontal reference line and a plurality of substantially parallel vertical reference lines;

means for generating an image frame of said calibration object, said image frame including a plurality of columns and lines of data values, said image frame generating means including:

means for irradiating said calibration object with x-rays, means for detecting x-rays which pass through said calibration object, means for generating a set of data values corresponding to said detected x-rays, and means for selecting a predetermined set of said data values corresponding to a predetermined partial image frame;

means for generating from said data values a first correction table including a plurality of first correction values corresponding to amounts of vertical distortion of the horizontal reference line at a plurality of column locations in said partial image frame;

means for applying said first correction values to generate a line of vertically corrected data values for the horizontal reference line;

means for scanning said line of vertically corrected data values to identify the column locations of each of the vertical reference lines;

means for generating a second correction table including second correction values corresponding to amounts of horizontal distortion between the vertical reference lines; and means for correcting distortions of an object under test using said first and second correction values.

27. A method of correcting distortions in an imaging system using a calibration object having at least one reference line, said imaging system including a rotating gantry, said method comprising the steps of:

rotating a gantry around said calibration object;

generating a plurality of image frames of said calibration object as said gantry rotates around said calibration object, each said image frame including a plurality of columns and lines of data values, said image frame generating step including the steps of:
  irradiating said calibration object with x-rays, detecting x-rays which pass through said calibration object,
  generating a set of data values corresponding to said detected x-rays, and
  selecting a predetermined set of said data values corresponding to a predetermined partial image frame of each of the image frames;

generating a correction table having a plurality of lines of correction values, each line of correction values corresponding to amounts of distortion of the reference line at a plurality of column locations in a different one of said plurality of partial image frames; and correcting the distortions of a plurality of image frames of an object under test using said correction values from said correction table, wherein one of said plurality of lines from the correction table is used to correct at least one of said plurality of image frames of said object under test.

28. An apparatus for correcting distortions in an imaging system including a rotating gantry, said apparatus comprising:

calibration object having at least one reference line;

means for rotating said gantry about said calibration object;

means for generating a plurality of image frames of said calibration object as said gantry rotates about said calibration object, each said image frame including a plurality of columns and lines of data values, said image frame generating means including:
  means for irradiating said calibration object with x-rays,
  means for detecting x-rays which pass through said calibration object,
  means for generating a set of data values corresponding to said detected x-rays, and
  means for selecting a predetermined set of said data values corresponding to a predetermined partial image frame of each of said image frames;

means for generating a correction table having a plurality of lines of correction values, each line of correction values corresponding to amounts of distortion of the reference line at a plurality of column locations in a different one of said plurality of image frames; and means for correcting the distortions of a plurality of image frames of an object under test using said correction values from said correction table, wherein one of said plurality of lines from the correction table is used to correct at least one of said plurality of image frames of said object under test.

29. A method of correcting distortions in an imaging system using a calibration object having a plurality of substantially parallel reference lines, said image system including a rotating gantry, said method comprising the steps of;

rotating a gantry about said calibration object, generating a plurality of image frames of said calibration object as said gantry rotates around said calibration object, each said image frame including a plurality of columns and lines of data values, said image frame generating step including the steps of:
  irradiating said calibration object with x-rays, detecting x-rays which pass through said calibration object,
  generating a set of data values corresponding to the detect x-rays, and
  selecting a predetermined set of said data values corresponding to a predetermined partial image frame of each of said image frames;

generating a correction table having a plurality of lines of correction values, each said line of correction values corresponding to amounts of distortion between adjacent reference lines of the calibration object for a different one of said plurality of image frames; and correcting distortions of a plurality of image frames of an object under test using said correction values from said correction table, wherein one of said plurality of lines from said correction table is used to correct at least one of said plurality of image frames of said object under test.

30. An apparatus for correcting distortions in an imaging system including a rotating gantry, said apparatus comprising:

a calibration object having a plurality of substantially parallel reference lines;

means for rotating said gantry around said calibration object;

means for generating a plurality of image frames of said calibration object as said gantry rotates around said calibration object, each said image frame including a plurality of columns and lines of data values, said image frame generating means including:
  means for irradiating said calibration object with x-rays,
  means for detecting x-rays which pass through said calibration object,
  means for generating a set of data values corresponding to the detected x-rays, and
  means for selecting a predetermined set of said data values corresponding to a partial image frame each of said image frames;

means for generating a correction table having a plurality of lines of correction values, each line of correction values corresponding to amounts of distortion between adjacent reference lines of the calibration object for a different one of said plurality of image frames; and means for correcting distortions of a plurality of image frames of an object under test using said correction values from said correction table, wherein one of said plurality of lines of said correction table is used to correct at least one of said plurality of image frames of said object under test.

* * * * *

UNITED STATES PATENT AND TRADEMARK OFFICE
CERTIFICATE OF CORRECTION

PATENT NO. : 5,235,528
DATED : August 10, 1993
INVENTOR(S) : Michael D. Silver et al.

It is certified that error appears in the above-indentified patent and that said Letters Patent is hereby corrected as shown below:

Claim 20, column 16, line 63, change "including;"
to --including:--.

Claim 21, column 17, line 25, change "numbers;"
to --numbers.--.

Claim 25, column 18, line 20, change "a steps"
to --the steps--.

UNITED STATES PATENT AND TRADEMARK OFFICE
CERTIFICATE OF CORRECTION

PATENT NO. : 5,235,528
DATED : August 10, 1993
INVENTOR(S) : Michael D. Silver et al It is certified that error appears in the above-indentified patent and that said Letters Patent is hereby corrected as shown below:

Claim 28, column 19, line 46, insert --a-- before "calibration".

Claim 29, column 20, line 10, change "of;" to --of: --.

Signed and Sealed this

Sixteenth Day of August, 1994

Attest:

BRUCE LEHMAN

*Attesting Officer*  *Commissioner of Patents and Trademarks*